US008705960B2

(12) United States Patent
Colbourne

(10) Patent No.: US 8,705,960 B2
(45) Date of Patent: Apr. 22, 2014

(54) M×N WAVELENGTH SELECTIVE SWITCH (WSS)

(75) Inventor: Paul Colbourne, Ottawa (CA)

(73) Assignee: JDS Uniphase Corporation, Milpitas, CA (US)

( * ) Notice: Subject to any disclaimer, the term of this patent is extended or adjusted under 35 U.S.C. 154(b) by 304 days.

(21) Appl. No.: 13/296,284

(22) Filed: Nov. 15, 2011

(65) Prior Publication Data

US 2012/0057869 A1 Mar. 8, 2012

Related U.S. Application Data

(63) Continuation-in-part of application No. 12/028,031, filed on Feb. 8, 2008, now Pat. No. 8,081,875.

(60) Provisional application No. 60/888,776, filed on Feb. 8, 2007.

(51) Int. Cl.
*H04J 14/00* (2006.01)
(52) U.S. Cl.
USPC ................................. 398/47; 398/48; 398/88
(58) Field of Classification Search
USPC .................... 398/47–48, 52, 75, 82–89, 96
See application file for complete search history.

(56) References Cited

U.S. PATENT DOCUMENTS

| | | | | |
|---|---|---|---|---|
| 6,097,859 A | 8/2000 | Solgaard et al. | ............ | 385/17 |
| 6,498,872 B2 | 12/2002 | Bouevitch et al. | ............ | 385/24 |
| 6,694,073 B2 | 2/2004 | Golub et al. | ............ | 385/18 |
| 6,707,959 B2 | 3/2004 | Ducellier et al. | ............ | 385/17 |
| 6,711,316 B2 | 3/2004 | Ducellier | ............ | 385/17 |
| 6,760,501 B2 | 7/2004 | Iyer et al. | ............ | 385/16 |
| 6,810,169 B2 | 10/2004 | Bouevitch | ............ | 385/24 |
| 6,941,073 B2 | 9/2005 | McGuire | ............ | 398/84 |
| 7,088,882 B2 | 8/2006 | Ducellier et al. | ............ | 385/17 |
| 7,106,926 B2 | 9/2006 | Cerato | ............ | 385/18 |
| 7,330,615 B2 | 2/2008 | McGuire, Jr. | ............ | 385/16 |
| 7,636,503 B2 | 12/2009 | Yamamoto et al. | ............ | 385/18 |
| 7,720,329 B2 | 5/2010 | Presley et al. | ............ | 385/18 |
| 7,725,027 B2 | 5/2010 | Keyworth et al. | ............ | 398/47 |
| 7,769,255 B2 | 8/2010 | Nagy et al. | ............ | 385/18 |
| 2006/0077552 A1* | 4/2006 | Helbing et al. | ............ | 359/566 |

(Continued)

OTHER PUBLICATIONS

"Wavelength-Selective 1×K Switches Using Free-Space Optics and MEMS Micromirrors: Theory, Design, and Implementation" by Marom, et al., Journal of Lightwave Technology, 2005, vol. 23, pp. 1620-1630.

*Primary Examiner* — Dzung Tran
(74) *Attorney, Agent, or Firm* — Teitelbaum & MacLean; Neil Teitelbaum; Doug MacLean

(57) ABSTRACT

An M×N wavelength-selective switch (WSS) is provided. M input ports launch M input beams towards a wavelength-dispersing system, which disperses the M input beams into M×K sub-beams at K wavelength bands. A redirecting system redirects the M×K sub-beams towards a first 1×K switching array, which selects K sub-beams from the M×K sub-beams. The redirecting system blocks the (M−1)×K non-selected sub-beams, but re-images the K selected sub-beams onto a second 1×K switching array by means of at least one relaying element having optical power. The second 1×K switching array routes the K selected sub-beams to N output ports. The redirecting system redirects the K selected sub-beams towards the wavelength-dispersing system, which combines any selected sub-beams that are routed to a same output port. The N output ports then output the K selected sub-beams.

18 Claims, 9 Drawing Sheets

(56) References Cited

U.S. PATENT DOCUMENTS

| | | | |
|---|---|---|---|
| 2006/0239607 A1* | 10/2006 | Yamamoto et al. | 385/16 |
| 2006/0239608 A1* | 10/2006 | Akashi | 385/18 |
| 2006/0245685 A1* | 11/2006 | Ducellier | 385/18 |
| 2008/0232800 A1 | 9/2008 | Jensen | 398/48 |
| 2008/0316585 A1* | 12/2008 | Cohen et al. | 359/303 |
| 2010/0061727 A1 | 3/2010 | Colbourne et al. | 398/48 |
| 2010/0172646 A1 | 7/2010 | Colbourne | 398/49 |
| 2011/0170867 A1 | 7/2011 | Keyworth et al. | 398/48 |

\* cited by examiner

M×N WAVELENGTH SELECTIVE SWITCH (WSS)

CROSS-REFERENCE TO RELATED APPLICATIONS

This application is a continuation-in-part of U.S. patent application Ser. No. 12/028,031 to Keyworth, et al., filed on Feb. 8, 2008 which claims priority from Ser. No. 60/888,376 filed Feb. 8, 2007.

TECHNICAL FIELD OF THE INVENTION

The present invention relates to wavelength-selective switches (WSSs). More particularly, the present invention relates to M×N WSSs having M input ports and N output ports.

BACKGROUND OF THE INVENTION

Wavelength-division multiplexing (WDM) has enabled a dramatic increase in the transmission capacity of fiber-optic systems. WDM combines a plurality of sub-beams at different wavelength bands for propagation through an optical fiber as a multiplexed beam. As each sub-beam carries a signal, multiple signals can be transmitted simultaneously. Wavelength-selective switches (WSSs) are used to route the individual sub-beams, and the signals they carry, along particular optical paths.

With reference to FIGS. 1A and 1B, a reflective embodiment of a 1×N WSS 100A is disclosed in U.S. Pat. No. 6,707,959 to Ducellier, et al., issued on Mar. 16, 2004, which is incorporated herein by reference. The 1×N WSS 100A has a 1×N wavelength-selective switching functionality, that is, the ability to route individual sub-beams from one input port to N output ports. If used in reverse, the 1×N WSS 100A has an N×1 wavelength-selective switching functionality, that is, the ability to route individual sub-beams from N input ports to one output port.

In the 1×N WSS 100A, a multiplexed input beam is launched from an input port in a front-end unit 110 towards a spherical mirror 120. The input beam is redirected from the spherical mirror 120 to a reflective diffraction grating 130, which disperses the input beam into K sub-beams at K wavelength bands. The K sub-beams are then redirected from the reflective diffraction grating 130, via the spherical mirror 120, to a microelectromechanical system (MEMS) mirror array 140 of K mirrors, i.e. a 1×K MEMS mirror array, which routes the K sub-beams to N output ports in the front-end unit 110. Each mirror is associated with a particular wavelength band and can be tilted about a tilt axis to route the sub-beam at the particular wavelength band to one of the N output ports. The K sub-beams are redirected from the MEMS mirror array 140, via the spherical mirror 120, back to the reflective diffraction grating 130, which combines any sub-beams that are routed to a same output port. The K sub-beams are then redirected from the reflective diffraction grating 130, via the spherical mirror 120, to the N output ports in the front-end unit 110, which output the K sub-beams.

With reference to FIGS. 1C and 1D, in a transmissive embodiment of the 1×N WSS 100B, the optical path of the 1×N WSS 100A is "unfolded" by replacing reflective components by transmissive components. In these simplified drawings, the front-end unit 110 is omitted, and an input port 111 and N output ports 112, e.g. N=5, are illustrated individually instead. The spherical mirror 120 is replaced by a first spherical lens 121 and a second spherical lens 122, and the first and last reflections from the spherical mirror 120 are omitted. The reflective diffraction grating 130 is replaced by a first transmissive diffraction grating 131 and a second transmissive diffraction grating 132.

In the 1×N WSS 100B, a multiplexed input beam is launched from the input port 111 towards the first transmissive diffraction grating 131, which disperses the input beam into K sub-beams, e.g. K=3, at K wavelength bands. The K sub-beams are then redirected from the first transmissive diffraction grating 131, via the first spherical lens 121, to the MEMS mirror array 140 of K mirrors, which routes the K sub-beams to the N output ports 112. Each mirror is associated with a particular wavelength band and can be tilted about a tilt axis to route the sub-beam at the particular wavelength band to one of the N output ports 112. The K sub-beams are redirected from the MEMS mirror array 140, via the second spherical lens 122, to the second transmissive diffraction grating 132, which combines any sub-beams that are routed to a same output port 112. The K sub-beams are then received by the N output ports 112, which output the K sub-beams.

Other examples of 1×N WSSs including a single MEMS mirror array are disclosed in U.S. Pat. No. 6,498,872 to Bouevitch, et al., issued on Dec. 24, 2002, in U.S. Pat. No. 6,760,501 to Iyer, et al., issued on Jul. 6, 2004, and in U.S. Pat. No. 6,810,169 to Bouevitch, issued on Oct. 26, 2004, all of which are incorporated herein by reference. A 1×N WSS including a plurality of MEMS mirror arrays is disclosed in U.S. Patent Application Publication No. 2011/0170867 to Keyworth, et al., published on Jul. 14, 2011, which is also incorporated herein by reference.

Two 1×N WSSs, one of which is used in reverse, may be cascaded to obtain an M×N switching functionality, that is, the ability to route individual sub-beams from M input ports to N output ports. With reference to FIG. 2, by cascading an M×1 WSS 201, which has M input ports 211, e.g. M=4, and one output port 212, with a 1×N WSS 202, which has one input port 213 and N output ports 214, e.g. N=5, an M×N switching cascade 200 is obtained. An example of a hitless M×N switching cascade is disclosed in U.S. Patent Application Publication No. 2010/0061727 to Colbourne, et al., published on Mar. 11, 2010, which is incorporated herein by reference.

However, in such M×N switching cascades, the sub-beams must be combined by a diffraction grating upon exiting the M×1 WSS, coupled into an optical fiber between the M×1 WSS and the 1×N WSS, and re-dispersed by a diffraction grating upon entering the 1×N WSS. To avoid the losses associated with these two diffraction-grating passes and the optical-fiber coupling, an M×N WSS is desired.

Most prior-art M×N WSSs, such as those disclosed in U.S. Pat. No. 6,711,316 to Ducellier, issued on Mar. 23, 2004, in U.S. Pat. No. 6,694,073 to Golub, et al., issued on Feb. 17, 2004, in U.S. Pat. No. 7,106,926 to Cerato, issued on Sep. 12, 2006, and in U.S. Patent Application Publication No. 2010/0172646 to Colbourne, published on Jul. 8, 2010, all of which are incorporated herein by reference, include an M×K MEMS mirror array and/or a K×N MEMS mirror array. Unfortunately, such large MEMS mirror arrays are expensive and difficult to fabricate.

Examples of M×N WSSs including two 1×K MEMS mirror arrays are disclosed in U.S. Pat. No. 7,720,329 to Presley, et al., issued on May 18, 2010, and in U.S. Pat. No. 7,769,255 to Nagy, et al., issued on Aug. 3, 2010, which are incorporated herein by reference. However, these M×N WSSs do not include a relaying element having optical power between the two 1×K MEMS mirror arrays for re-imaging the sub-beams. Therefore, the sub-beams must have a large enough beam size to remain collimated while propagating between the two 1×K MEMS mirror arrays, resulting in the M×N WSSs being undesirably large.

SUMMARY OF THE INVENTION

Accordingly, the present invention relates to an M×N wavelength-selective switch (WSS) including two 1×K switching arrays and at least one relaying element having optical power between the two 1×K switching arrays.

One aspect of the present invention relates to an M×N WSS comprising: M input ports for launching M input beams, wherein each of the M input beams includes K sub-beams at K wavelength bands, and wherein M and K are integers greater than 1; N output ports for outputting K selected sub-beams at the K wavelength bands, wherein N is an integer greater than 1; a wavelength-dispersing system, disposed to receive the M input beams from the M input ports, for dispersing the M input beams into the M×K sub-beams; a redirecting system including at least one relaying element having optical power, wherein the redirecting system is disposed to receive the M×K sub-beams from the wavelength-dispersing system, and is for redirecting the M×K sub-beams; a first switching array of K first reflecting elements, disposed to receive the M×K sub-beams from the redirecting system, for selecting the K selected sub-beams from the M×K sub-beams; wherein each of the K first reflecting elements is associated with one wavelength band of the K wavelength bands, is disposed to receive the M sub-beams at that wavelength band, and is for selecting one sub-beam from the M sub-beams at that wavelength band; wherein the redirecting system is also disposed to receive the M×K sub-beams from the first switching array, and is also for passing the K selected sub-beams while blocking the (M−1)×K non-selected sub-beams, and for re-imaging only the K selected sub-beams by means of the at least one relaying element; a second switching array of K second reflecting elements, disposed to receive the K selected sub-beams from the redirecting system, for routing the K selected sub-beams to the N output ports; wherein each of the K second reflecting elements is associated with one wavelength band of the K wavelength bands, is disposed to receive the selected sub-beam at that wavelength band, and is for routing the selected sub-beam at that wavelength band to one output port of the N output ports; wherein the redirecting system is also disposed to receive the K selected sub-beams from the second switching array, and is also for redirecting the K selected sub-beams; wherein the wavelength-dispersing system is also disposed to receive the K selected sub-beams from the redirecting system, and is also for combining any selected sub-beams that are routed to a same output port of the N output ports; and wherein the N output ports are disposed to receive the K selected sub-beams from the wavelength-dispersing system.

BRIEF DESCRIPTION OF THE DRAWINGS

The present invention will be described in greater detail with reference to the accompanying drawings wherein.

DETAILED DESCRIPTION OF THE INVENTION

Figure 1A:
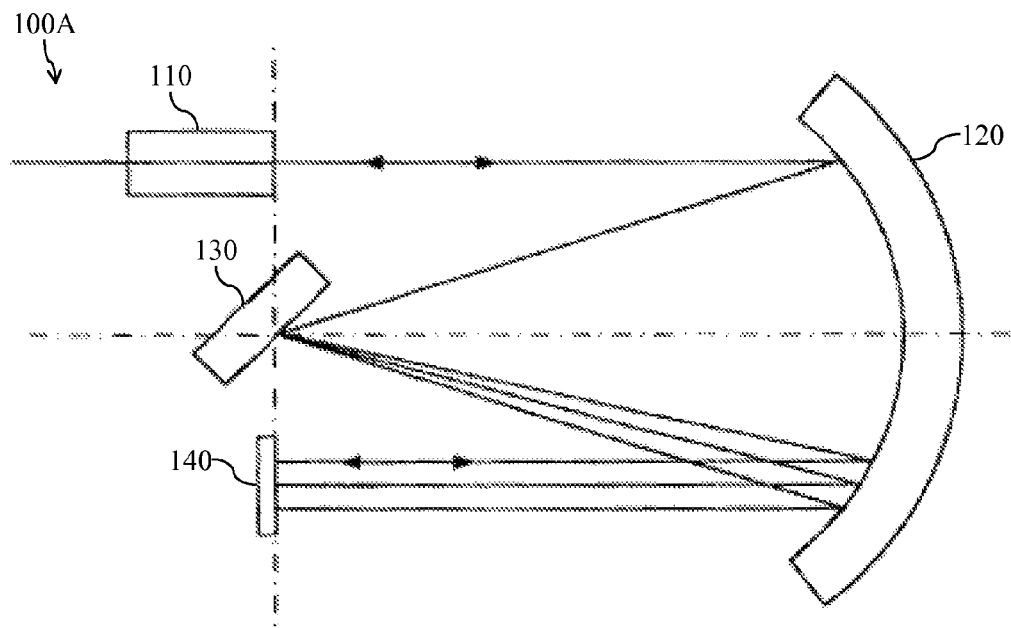
FIG. 1A is a schematic illustration of a top view of a reflective embodiment of a prior-art 1×N wavelength-selective switch (WSS)
Figure 1B:
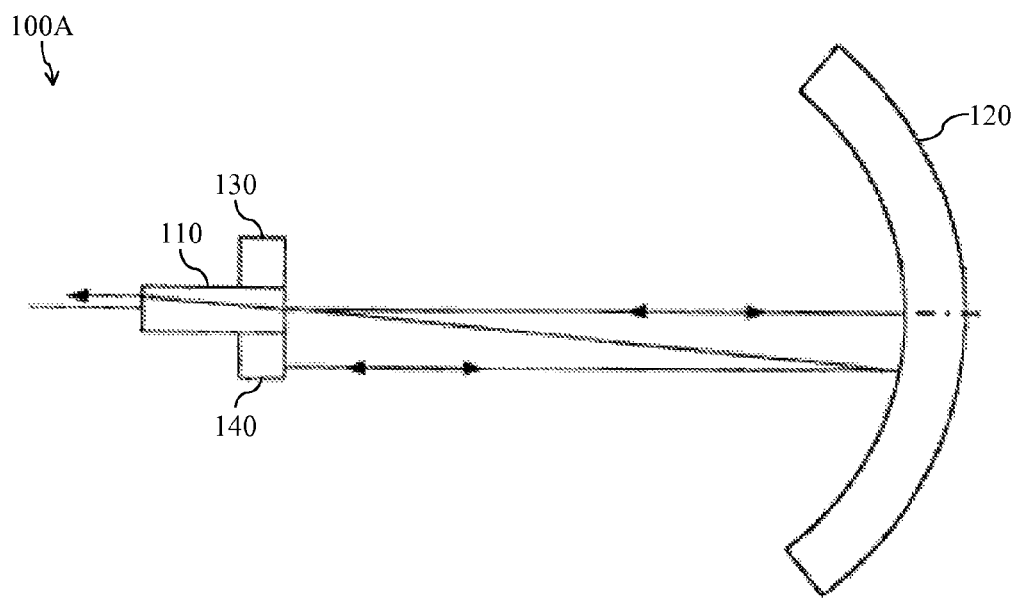
FIG. 1B is a schematic illustration of a side view of the reflective embodiment of FIG. 1A.
Figure 1C:
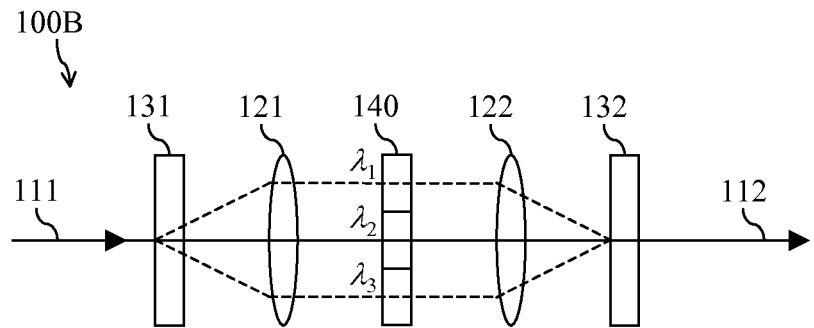
FIG. 1C is a schematic illustration of a top view of a transmissive embodiment of the prior-art 1×N WSS of FIGS. 1A and 1B.
Figure 1D:
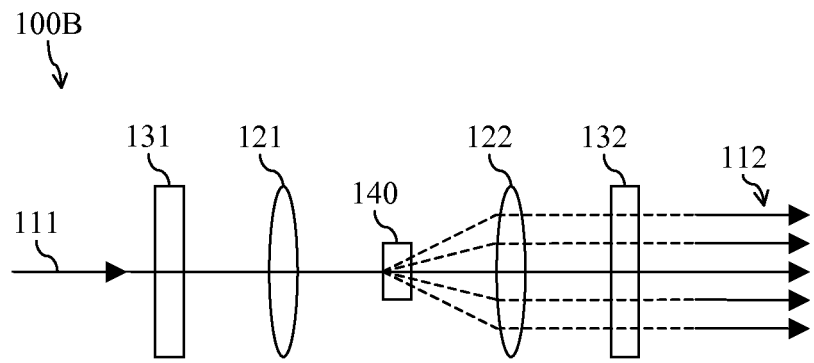
FIG. 1D is a schematic illustration of a side view of the transmissive embodiment of FIG. 1C.
Figure 2:
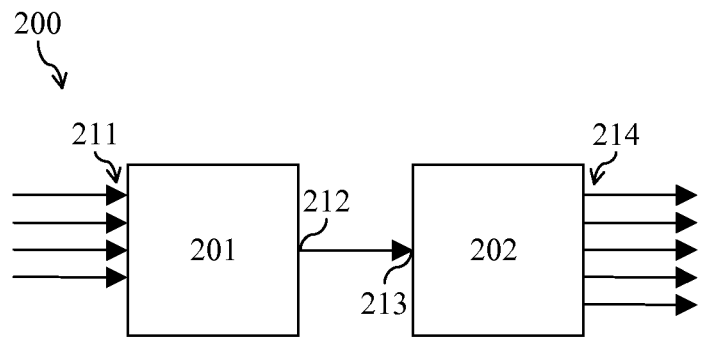
FIG. 2 is a block diagram of a prior-art M×N switching cascade.

The present invention provides an M×N wavelength-selective switch (WSS) including two 1×K switching arrays. In the M×N WSS of the present invention, sub-beams are not combined and redispersed between the two 1×K switching arrays, nor are they coupled into an optical fiber. Therefore, the M×N WSS avoids the losses associated with two of the four diffraction-grating passes in the prior-art M×N switching cascade 200 of FIG. 2, as well as the loss associated with the optical-fiber coupling between the M×1 WSS 201 and the 1×N WSS 202. As most of the total loss of a WSS can be attributed to the losses associated with diffraction-grating passes and optical-fiber couplings, the total loss of the M×N WSS is comparable to that of either the M×1 WSS 201 or the 1×N WSS 202. Thus, the total loss of the M×N WSS is effectively halved relative to that of the M×N switching cascade 200.

Furthermore, in the M×N WSS of the present invention, sub-beams are re-imaged between the two 1×K switching arrays by means of at least one relaying element having optical power. Therefore, the sub-beams may have a smaller beam size than in the prior-art M×N WSSs including two 1×K switching arrays, allowing the M×N WSS of the present invention to have a more compact structure.

Several exemplary embodiments of the M×N WSS of the present invention are described herein, each of which includes M input ports, N output ports, a wavelength-dispersing system, a redirecting system, a first switching array of K first reflecting elements, i.e. a first 1×K switching array, and a second switching array of K second reflecting elements, i.e. a second 1×K switching array.

The wavelength-dispersing system includes at least one wavelength-dispersing element, which is, typically, a transmissive diffraction grating, a reflective diffraction grating, or a combination of a transmissive diffraction grating and a planar mirror. In some embodiments, the wavelength-dispersing system includes a first wavelength-dispersing element and a second wavelength-dispersing element, whereas in other embodiments, the wavelength-dispersing system includes only a first wavelength-dispersing element.

The redirecting system includes at least one relaying element having optical power, which is, typically, a spherical lens, a spherical mirror, a cylindrical lens, or a cylindrical mirror. The redirecting system may also include a retroreflector or a relaying element not having optical power, such as a planar mirror or a prism. Generally, the redirecting system also includes at least one redirecting element having optical power, which is, typically, a spherical lens or a spherical mirror, as well as a blocking element, which is, typically, a spherical lens, a spherical mirror, a cylindrical lens, a cylindrical mirror, or an aperture.

In some embodiments, the redirecting system includes a first redirecting element having optical power, a second redirecting element having optical power, and a relaying assembly including the at least one relaying element having optical power. More specifically, the relaying assembly may include a first relaying element having optical power, a second relaying element having optical power, and a blocking element. In some instances, the relaying assembly may also include a third relaying element having optical power and a fourth relaying element having optical power.

In other embodiments, the redirecting system includes a first redirecting element having optical power and a relaying assembly including the at least one relaying element having optical power. More specifically, the relaying assembly may include a first relaying element having optical power, a second relaying element having optical power, a blocking element, and a retroreflector. In yet other embodiments, the redirecting system includes a first relaying element having optical power, a second relaying element, a third relaying element, and a retroreflector.

Typically, the first switching array of K first reflecting elements and the second switching array of K second reflecting elements are microelectromechanical system (MEMS) mirror arrays, and the first and second reflecting elements are planar mirrors. Alternatively, the first and second switching arrays may be liquid crystal on silicon (LCOS) arrays, and the first and second reflecting elements may be portions of the LCOS arrays.

In describing the exemplary embodiments of the M×N WSS, directional terms, such as "horizontal" and "vertical", are used to indicate the relative orientation of various optical elements, rather than the absolute orientation of the optical elements. Furthermore, it will be apparent to those skilled in the art that the relative orientation of the optical elements may be modified, for example, through the inclusion of additional optical elements, without affecting the operation of the M×N WSS.

Figure 3A:
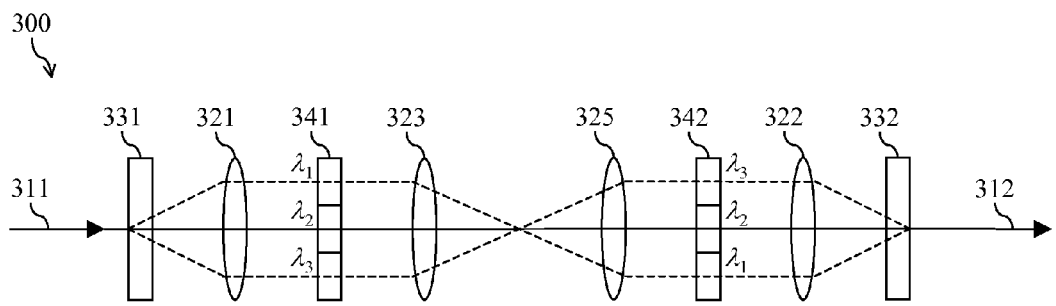
FIG. 3A is a schematic illustration of a top view of a first embodiment of an M×N WSS according to the present invention.
Figure 3B:
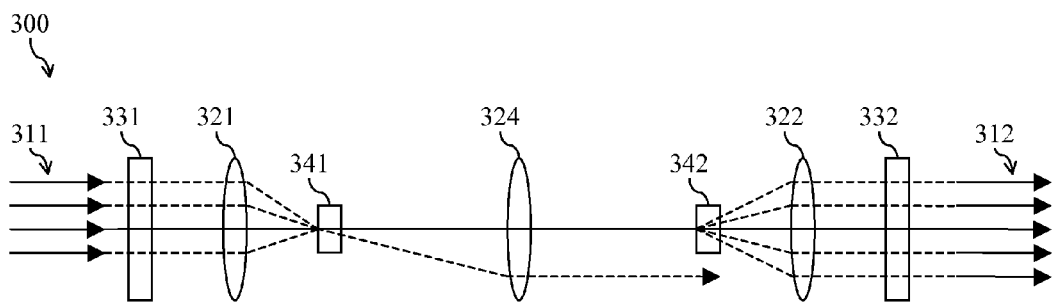
FIG. 3B is a schematic illustration of a side view of the first embodiment of FIG. 3A.

With reference to FIGS. 3A and 3B, a first embodiment of the M×N WSS 300 comprises M input ports 311, M being an integer greater than 1, e.g. M=4, N output ports 312, N being an integer greater than 1, e.g. N=5, a wavelength-dispersing system including a first transmissive diffraction grating 331 and a second transmissive diffraction grating 332, a redirecting system including a first spherical lens 321, a second spherical lens 322, a first horizontal cylindrical lens 323, a vertical cylindrical lens 324, and a second horizontal cylindrical lens 325, a first MEMS mirror array 341 of K first mirrors, K being an integer greater than 1, e.g. K=3, as the first switching array, and a second MEMS mirror array 342 of K second mirrors as the second switching array. The first spherical lens 321, the second spherical lens 322, the first horizontal cylindrical lens 323, the vertical cylindrical lens 324, and the second horizontal cylindrical lens 325 all have positive optical power.

The M input ports 311 launch M multiplexed input beams into the M×N WSS 300. For ease of understanding, the operation of the M×N WSS 300 will be described for the situation where each of the M input beams includes K sub-beams at K wavelength bands. However, although each of the M input ports 311 is capable of launching an input beam including K sub-beams at the K wavelength bands, a particular input port 311 may launch an input beam including fewer than K sub-beams. It is not necessary for all of the M input beams to include sub-beams at all of the K wavelength bands.

Typically, the M input ports 311 are arranged in a vertical one-dimensional array at a front end of the M×N WSS 300. Optionally, one or more block ports may also be included in the one-dimensional array, to allow quasi-hitless or hitless switching, as described in U.S. Patent Application Publication No. 2010/0061727. Also optionally, one or more input lenses may be disposed at the front end of the M×N WSS 300 to condition the M input beams, as described in U.S. Pat. No. 6,707,959, in U.S. Pat. No. 6,760,501, and in U.S. Patent Application Publication No. 2011/0170867. Also optionally, one or more fold mirrors may be disposed at the front end to provide a more compact arrangement.

The first transmissive diffraction grating 331 receives the M input beams from the M input ports 311 and horizontally disperses the M input beams into the M×K sub-beams. That is, the first transmissive diffraction grating 331 disperses each of the M input beams into its K constituent sub-beams at the K wavelength bands in a horizontal dispersion direction, the dispersion direction being defined as the direction of increasing wavelength.

The first spherical lens 321 receives the M×K sub-beams from the first transmissive diffraction grating 331 and redirects the M×K sub-beams towards the first MEMS mirror array 341. The first spherical lens 321 makes the M×K sub-beams horizontally parallel (FIG. 3A) and vertically converges the M×K sub-beams (FIG. 3B). That is, the first spherical lens 321 provides a horizontal angle-to-offset function (FIG. 3A), converting angles imparted by the first transmissive diffraction grating 331 into offsets. Simultaneously, the first spherical lens 321 provides a vertical offset-to-angle function (FIG. 3B), converting offsets between the M input ports 311 in the one-dimensional array into angles. Thereby, the M sub-beams at each of the K wavelength bands are redirected towards a particular first mirror of the first MEMS mirror array 341.

The first MEMS mirror array 341 receives the M×K sub-beams from the first spherical lens 321 and selects K sub-beams at the K wavelength bands from the M×K sub-beams. Typically, the K first mirrors of the first MEMS mirror array 341 are arranged in a horizontal one-dimensional array. Each of the K first mirrors is associated with one of the K wavelength bands, receives the M sub-beams at that wavelength band, and selects one sub-beam from the M sub-beams at that wavelength band to be routed to the second MEMS mirror array 342. Each of the K first mirrors can be tilted about a horizontal tilt axis, in response to a control signal, to select the one sub-beam to be routed to the second MEMS mirror array 342.

Optionally, quasi-hitless or hitless switching may be achieved by tilting a first mirror about the tilt axis to select a block port, rather than a sub-beam, as described in U.S. Patent Application Publication No. 2010/0061727.

The first horizontal cylindrical lens 323 receives the M×K sub-beams from the first MEMS mirror array 341 and redirects the M×K sub-beams towards the vertical cylindrical lens 324. The first horizontal cylindrical lens 323 horizontally converges the M×K sub-beams (FIG. 3A). That is, the first horizontal cylindrical lens 323 provides a horizontal offset-to-angle function (FIG. 3B), converting offsets between the K mirrors in the first MEMS mirror array 341 into angles.

The vertical cylindrical lens 324 receives the M×K sub-beams from the first horizontal cylindrical lens 323 and redirects the K selected sub-beams towards the second horizontal cylindrical lens 325. The vertical cylindrical lens 324 makes the M×K sub-beams vertically parallel (FIG. 3B). That is, the vertical cylindrical lens 324 provides a vertical angle-to-offset function (FIG. 3B), converting angles imparted by the first MEMS mirror array 341 into offsets. Advantageously, the offsets imparted by the vertical cylindrical lens 324 ensure that only the K selected sub-beams are vertically aligned with the second MEMS mirror array 342, while the (M−1)×K non-selected sub-beams are vertically offset from second MEMS mirror array 342. Thereby, the K selected sub-beams are passed to the second MEMS mirror array 342, while the (M−1)×K non-selected sub-beams are blocked from reaching the second MEMS mirror array 342.

In some instances, it is desirable that the vertical beam size of the K selected sub-beams be substantially equal at the first MEMS mirror array 341 and the second MEMS mirror array 342. In such instances, the focal length f of the vertical cylindrical lens 324 should be substantially equal to the Rayleigh range $z_R$ of the K selected sub-beams, as described by Equation (1):

$$f = z_R = \frac{\pi \omega_y^2}{\lambda}, \tag{1}$$

where $\omega_y$ is the vertical beam radius and $\lambda$ is the average wavelength.

In other instances, particularly when M is not equal to N, it may be desirable that the vertical beam size of the K selected sub-beams be different at the first MEMS mirror array 341 and the second MEMS mirror array 342. In such instances, the focal length f of the vertical cylindrical lens 324 should satisfy Equation (2):

$$f = \frac{\pi \omega_{y1} \omega_{y2}}{\lambda}, \tag{2}$$

where $\omega_{y1}$ and $\omega_{y2}$ are the vertical beam radii at the first MEMS mirror array 341 and the second MEMS mirror array 342, respectively, and $\lambda$ is the average wavelength. Preferably, the first MEMS mirror array 341 and the second MEMS mirror array 342 are each disposed approximately in a focal plane of the vertical cylindrical lens 324.

The second horizontal cylindrical lens 325 receives the K selected sub-beams from the vertical cylindrical lens 324 and redirects the K selected sub-beams towards the second MEMS mirror array 342. The second horizontal cylindrical lens 325 makes the K selected sub-beams horizontally parallel (FIG. 3A). That is, the second horizontal cylindrical lens 325 provides a horizontal angle-to-offset function (FIG. 3A), re-converting the angles imparted by the first horizontal cylindrical lens 323 into offsets. Thereby, the K selected sub-beams are re-imaged onto the second MEMS mirror array 342.

Preferably, the first horizontal cylindrical lens 323 and the second horizontal cylindrical lens 325 provide a 1:1 re-imaging function to ensure that the horizontal beam size of the K selected sub-beams is substantially equal at the first MEMS mirror array 341 and the second MEMS mirror array 342. Thus, it is preferred that the focal lengths of the first horizontal cylindrical lens 323 and the second horizontal cylindrical lens 325 be substantially equal, that the first horizontal cylindrical lens 323 and the second horizontal cylindrical lens 325 be spaced approximately two focal lengths apart, that the first MEMS mirror array 341 be disposed approximately in a focal plane of the first horizontal cylindrical lens 323, and that the second MEMS mirror array 342 be disposed approximately in a focal plane of the second horizontal cylindrical lens 325.

Advantageously, the first horizontal cylindrical lens 323, the vertical cylindrical lens 324, and the second horizontal cylindrical lens 325 ensure that the beam size of the K selected sub-beams remains relatively small and uniform as the K selected sub-beams propagate from the first MEMS mirror array 341 to the second MEMS mirror array 342, allowing a more compact M×N WSS 300. However, it should be noted that the K selected sub-beams are horizontally inverted on passing through the three cylindrical lenses.

The second MEMS mirror array 342 receives the K selected sub-beams from the second horizontal cylindrical lens 325 and routes the K selected sub-beams to the N output ports 312. Typically, the K second mirrors of the second MEMS mirror array 342 are arranged in a horizontal one-dimensional array. Each of the K second mirrors is associated with one wavelength band of the K wavelength bands, receives the selected sub-beam at that wavelength band, and routes the selected sub-beam at that wavelength band to one output port 312 of the N output ports 312. Each of the K second mirrors can be tilted about a horizontal tilt axis, in response to a control signal, to route the selected sub-beam to the output port 312.

Optionally, quasi-hitless or hitless switching may be achieved by tilting a second mirror about the tilt axis to route the selected sub-beam to a block port, rather than an output port, as described in U.S. Patent Application Publication No. 2010/0061727.

Advantageously, the use of two switching arrays, the first MEMS mirror array 341 for sub-beam selection and the second MEMS mirror array 342 for sub-beam routing, rather than a single switching array minimizes undesired port connections in the M×N WSS 300.

Furthermore, it should be noted that the M×N WSS 300 is a blocking WSS, meaning that only one sub-beam at a particular wavelength band, from one particular input port 311, is routed to a particular output port. The other sub-beams at that wavelength band, from other input ports 311, are blocked. Despite this limitation, the M×N WSS 300 has the advantages of being less expensive and easier to fabricate than prior-art non-blocking M×N WSSs, which require much larger switching arrays.

The second spherical lens 322 receives the K selected sub-beams from the second MEMS mirror array 342 and redirects the K selected sub-beams towards the second transmissive diffraction grating 332. The second spherical lens 322 horizontally converges the K selected sub-beams (FIG.

3A) and makes the K selected sub-beams vertically parallel (FIG. 3B). That is, the second spherical lens 322 provides a horizontal offset-to-angle function (FIG. 3A), converting offsets between the K second mirrors in the second MEMS mirror array 342 into angles. Simultaneously, the second spherical lens 322 provides a vertical angle-to-offset function (FIG. 3B), converting angles imparted by the second MEMS mirror array 342 into offsets. Thereby, each of the K selected sub-beams is redirected towards the output port 312 to which it is routed, via the second transmissive diffraction grating 332.

The second transmissive diffraction grating 332 receives the K selected sub-beams from the second spherical lens 322 and horizontally combines any selected sub-beams that are routed to a same output port 312 into an output beam. Thereby, the second transmissive diffraction grating 332 combines the K selected sub-beams into at most N output beams.

The N output ports 312 receive the K selected sub-beams, in the form of the at most N output beams, from the second transmissive diffraction grating 332. Although each of the N output ports 312 is capable of receiving an output beam including K sub-beams at the K wavelength bands, a particular output port 312 may not receive an output beam or may receive an output beam including fewer than K sub-beams.

Typically, the N output ports 312 are arranged in a vertical one-dimensional array at a back end of the M×N WSS 300. Optionally, one or more block ports may also be included in the one-dimensional array, to allow quasi-hitless or hitless switching, as described in U.S. Patent Application Publication No. 2010/0061727. Also optionally, one or more output lenses may be disposed at the back end of the M×N WSS 300 to condition the N output beams, as described in U.S. Pat. No. 6,707,959, in U.S. Pat. No. 6,760,501, and in U.S. Patent Application Publication No. 2011/0170867. Also optionally, one or more fold mirrors may be disposed at the back end to provide a more compact arrangement.

Figure 4A:
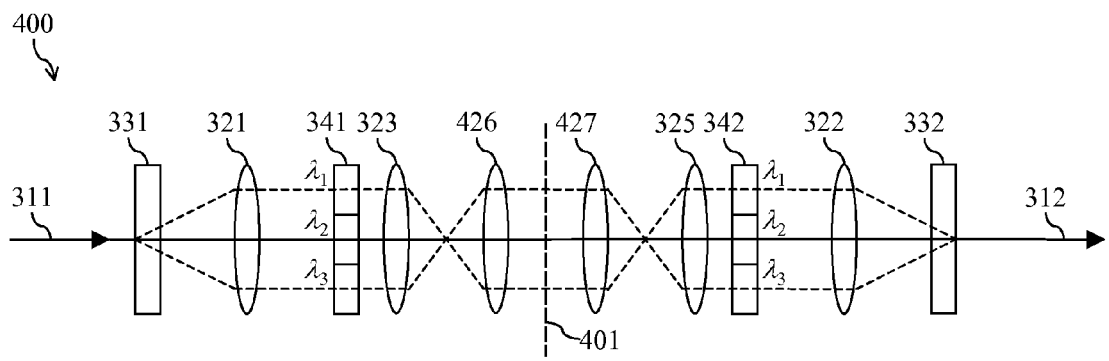
FIG. 4A is a schematic illustration of a top view of a second embodiment of an M×N WSS according to the present invention.
Figure 4B:
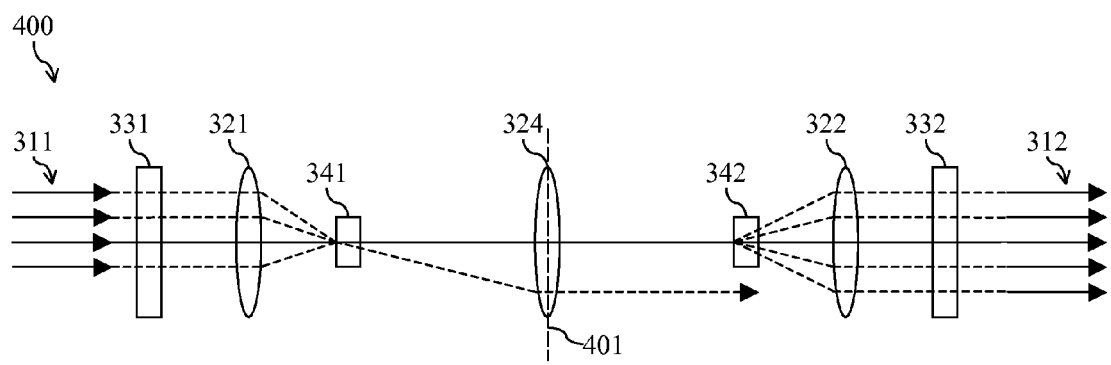
FIG. 4B is a schematic illustration of a side view of the second embodiment of FIG. 4A.

With reference to FIGS. 4A and 4B, a second embodiment of the M×N WSS 400 has mirror symmetry about a central plane 401, which allows it to be "folded" into a more compact structure that uses only half of the optical elements. The second embodiment of the M×N WSS 400 is similar to the first embodiment of the M×N WSS 300, but also includes a third horizontal cylindrical lens 426, inserted between the first horizontal cylindrical lens 323 and the vertical cylindrical lens 324, and a fourth horizontal cylindrical lens 427, inserted between the vertical cylindrical lens 324 and the second horizontal cylindrical lens 325, as part of the redirecting system. The third horizontal cylindrical lens 426 and the fourth horizontal cylindrical lens 427 both have positive optical power.

The input optical path from the M input ports 311 to the first horizontal cylindrical lens 323 in the second embodiment of the M×N WSS 400 is similar to that in the first embodiment of the M×N WSS 300. The first horizontal cylindrical lens 323 then redirects the M×K sub-beams towards the third horizontal cylindrical lens 426.

The third horizontal cylindrical lens 426 receives the M×K sub-beams from the first horizontal cylindrical lens 323 and redirects the M×K sub-beams towards the vertical cylindrical lens 324. The third horizontal cylindrical lens 426 makes the M×K sub-beams horizontally parallel (FIG. 4A). That is, the third horizontal cylindrical lens 426 provides a horizontal angle-to-offset function (FIG. 4A), re-converting the angles imparted by the first horizontal cylindrical lens 323 into offsets.

The vertical cylindrical lens 324 receives the M×K sub-beams from the third horizontal cylindrical lens 426 and redirects the K selected sub-beams towards the fourth horizontal cylindrical lens 427, performing essentially the same function described heretofore.

The fourth horizontal cylindrical lens 427 receives the K selected sub-beams from the vertical cylindrical lens 324 and redirects the K selected sub-beams towards the second horizontal cylindrical lens 325. The fourth horizontal cylindrical lens 427 horizontally converges the K selected sub-beams (FIG. 4A). That is, the fourth horizontal cylindrical lens 427 provides a horizontal offset-to-angle function (FIG. 4A), re-converting the offsets imparted by the third horizontal cylindrical lens 426 into angles.

The second horizontal cylindrical lens 325 receives the K selected sub-beams from the fourth horizontal cylindrical lens 427 and redirects the K selected sub-beams towards the second MEMS mirror array 342, performing essentially the same function described heretofore.

Preferably, the first horizontal cylindrical lens 323, the third horizontal cylindrical lens 426, the fourth horizontal cylindrical lens 427, and the second horizontal cylindrical lens 325 provide a 1:1 re-imaging function to ensure that the horizontal beam size of the K selected sub-beams is substantially equal at the first MEMS mirror array 341 and the second MEMS mirror array 342. Thus, it is preferred that the focal lengths of the first horizontal cylindrical lens 323, the third horizontal cylindrical lens 426, the fourth horizontal cylindrical lens 427, and the second horizontal cylindrical lens 325 be substantially equal, that adjacent cylindrical lenses be spaced approximately two focal lengths apart, that the first MEMS mirror array 341 be disposed approximately in a focal plane of the first horizontal cylindrical lens 323, and that the second MEMS mirror array 342 be disposed approximately in a focal plane of the second horizontal cylindrical lens 325.

Advantageously, the first horizontal cylindrical lens 323, the third horizontal cylindrical lens 426, the vertical cylindrical lens 324, the fourth horizontal cylindrical lens 427, and the second horizontal cylindrical lens 325 ensure that the beam size of the K selected sub-beams remains relatively small and uniform as the K selected sub-beams propagate from the first MEMS mirror array 341 to the second MEMS mirror array 342, allowing a more compact M×N WSS 400.

Furthermore, the inclusion of the two additional cylindrical lenses, advantageously, ensures that the K selected sub-beams are not horizontally inverted. Therefore, the first transmissive diffraction grating 331 and the second transmissive diffraction grating 332 have a common horizontal dispersion direction, and the first MEMS mirror array 341 and the second MEMS mirror array 342 have the same orientation relative to the dispersion direction.

The output optical path from the second horizontal cylindrical lens 325 to the N output ports 312 in the second embodiment of the M×N WSS 400 is similar to that in the first embodiment of the M×N WSS 300.

It will be apparent to those skilled in the art that the M×N WSS 400 may be "folded" across the central plane 401 according to a variety of designs to obtain a more compact embodiment that does not include the fourth horizontal cylindrical lens 427, the second horizontal cylindrical lens 325, the second spherical lens 322, or the second transmissive diffraction grating 332. The functions of these elements may be realized by a second pass through the third horizontal cylindrical lens 426, the first horizontal cylindrical lens 323, the first spherical lens 321, and the first transmissive diffraction grating 331. In such an embodiment, the vertical cylindrical lens 324 may be replaced by a vertical cylindrical mirror having positive optical power, for example.

Figure 5A:
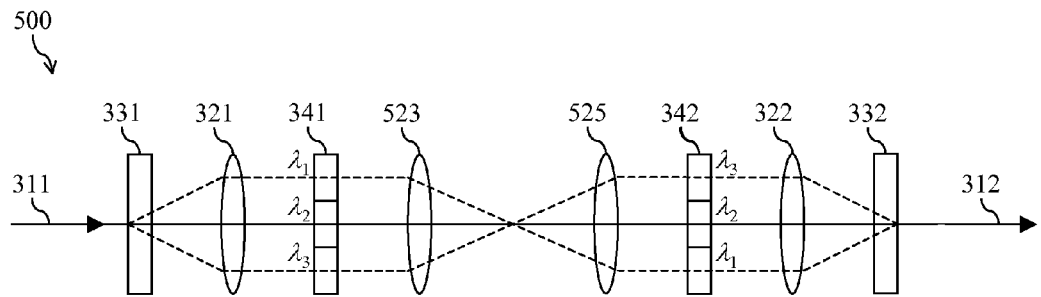
FIG. 5A is a schematic illustration of a top view of a third embodiment of an M×N WSS according to the present invention.
Figure 5B:
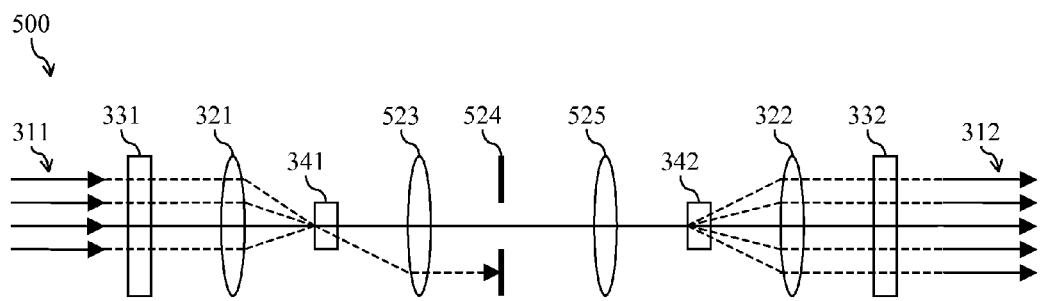
FIG. 5B is a schematic illustration of a side view of the third embodiment of FIG. 5A.

With reference to FIGS. 5A and 5B, a third embodiment of the M×N WSS 500 uses spherical lenses, which are easier to fabricate, rather than cylindrical lenses. The third embodiment of the M×N WSS 500 is similar to the first embodiment of the M×N WSS 300, but includes a third spherical lens 523, an aperture 524, and a fourth spherical lens 525, as part of the redirecting system, instead of the first horizontal cylindrical lens 323, the vertical cylindrical lens 324, and the second horizontal cylindrical lens 325. The third spherical lens 523 and the fourth spherical lens 525 both have positive optical power.

The input optical path from the M input ports 311 to the first MEMS mirror array 341 in the third embodiment of the M×N WSS 500 is similar to that in the first embodiment of the M×N WSS 300.

The third spherical lens 523 then receives the M×K sub-beams from the first MEMS mirror array 341 and redirects the M×K sub-beams towards the aperture 524. The third spherical lens 523 horizontally converges the M×K sub-beams (FIG. 5A) and makes the M×K sub-beams vertically parallel (FIG. 5B). That is, the third spherical lens 523 provides a horizontal offset-to-angle function (FIG. 5A), converting offsets between the K mirrors in the first MEMS mirror array 341 into angles. Simultaneously, the third spherical lens 523 provides a vertical angle-to-offset function (FIG. 5B), converting angles imparted by the first MEMS mirror array 341 into offsets. Advantageously, the offsets imparted by the third spherical lens 523 ensure that only the K selected sub-beams are vertically aligned to pass through the aperture 524, while the (M−1)×K non-selected sub-beams are vertically aligned to be blocked by the aperture 524. Thereby, the K selected sub-beams are passed to the second MEMS mirror array 342, while the (M−1)×K non-selected sub-beams are blocked from reaching the second MEMS mirror array 342.

The aperture 524, which is a horizontal rectangular aperture, receives the M×K sub-beams from the third spherical lens 523 and passes the K selected sub-beams towards the fourth spherical lens 525 while blocking the (M−1)×K non-selected sub-beams.

The fourth spherical lens 525 receives the K selected sub-beams from the aperture 524 and redirects the K selected sub-beams towards the second MEMS mirror array 342. The fourth spherical lens 525 makes the K selected sub-beams horizontally parallel (FIG. 5A). That is, the fourth spherical lens 525 provides a horizontal angle-to-offset function (FIG. 5A), re-converting the angles imparted by the third spherical lens 523 into offsets. Thereby, the K selected sub-beams are re-imaged onto the second MEMS mirror array 342.

Preferably, the third spherical lens 523 and the fourth spherical lens 525 provide a 1:1 re-imaging function to ensure that the beam size of the K selected sub-beams is substantially equal at the first MEMS mirror array 341 and the second MEMS mirror array 342. Thus, it is preferred that the focal lengths of the third spherical lens 523 and the fourth spherical lens 525 be substantially equal, that the third spherical lens 523 and the fourth spherical lens 525 be spaced approximately two focal lengths apart, that the first MEMS mirror array 341 be disposed approximately in a focal plane of the third spherical lens 523, and that the second MEMS mirror array 342 be disposed approximately in a focal plane of the fourth spherical lens 525.

Advantageously, the third spherical lens 523 and the fourth spherical lens 525 ensure that the beam size of the K selected sub-beams remains relatively small and uniform as the K selected sub-beams propagate from the first MEMS mirror array 341 to the second MEMS mirror array 342, allowing a more compact M×N WSS 500. However, it should be noted that the K selected sub-beams are horizontally inverted on passing through the two spherical lenses.

The second MEMS mirror array 342 receives the K selected sub-beams from the fourth spherical lens 525, and the output optical path from the second MEMS mirror array 342 to the N output ports 312 in the third embodiment of the M×N WSS 500 is similar to that in the first embodiment of the M×N WSS 300.

Figure 6A:
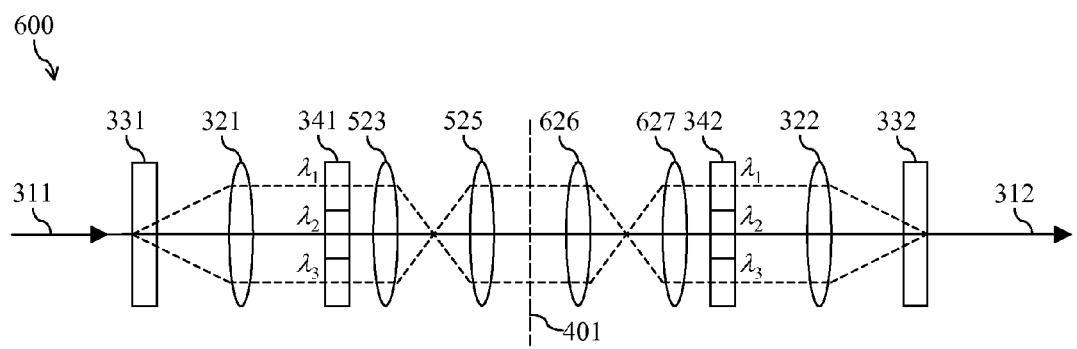
FIG. 6A is a schematic illustration of a top view of a fourth embodiment of an M×N WSS according to the present invention.
Figure 6B:
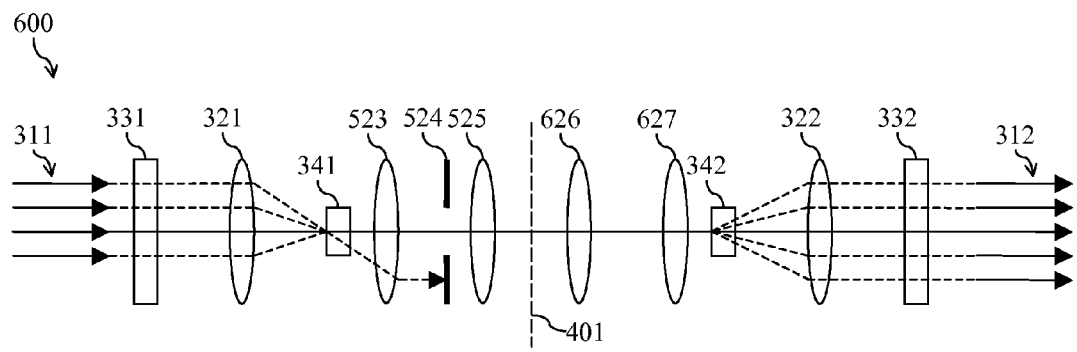
FIG. 6B is a schematic illustration of a side view of the fourth embodiment of FIG. 6A.

With reference to FIGS. 6A and 6B, a fourth embodiment of the M×N WSS 600 has mirror symmetry about a central plane 401, which allows it to be "folded" into a more compact structure that uses only half of the optical elements. The fourth embodiment of the M×N WSS 600 is similar to the third embodiment of the M×N WSS 500, but also includes a fifth spherical lens 626 and a sixth spherical lens 627, inserted between the fourth spherical lens 525 and the second MEMS mirror array 342, as part of the redirecting system. The fifth spherical lens 626 and the sixth spherical lens 627 both have positive optical power.

The input optical path from the M input ports 311 to the fourth spherical lens 525 in the fourth embodiment of the M×N WSS 600 is similar to that in the third embodiment of the M×N WSS 500. The fourth spherical lens 525 then redirects the K selected sub-beams towards the fifth spherical lens 626.

The fifth spherical lens 626 receives the K selected sub-beams from the fourth spherical lens 525 and redirects the K selected sub-beams towards the sixth spherical lens 627. The fifth spherical lens 626 horizontally converges the K selected sub-beams (FIG. 6A). That is, the fifth spherical lens 626 provides a horizontal offset-to-angle function (FIG. 6A), re-converting the offsets imparted by the fourth spherical lens 525 into angles.

The sixth spherical lens 627 receives the K selected sub-beams from the fifth spherical lens 626 and redirects the K selected sub-beams towards the second MEMS mirror array 342. The sixth spherical lens 627 makes the K selected sub-beams horizontally parallel (FIG. 6A). That is, the sixth spherical lens 627 provides a horizontal angle-to-offset function (FIG. 6A), re-converting the angles imparted by the fifth spherical lens 626 into offsets. Thereby, the K selected sub-beams are re-imaged onto the second MEMS mirror array 342.

Preferably, the third spherical lens 523, the fourth spherical lens 525, the fifth spherical lens 626, and the sixth spherical lens 627 provide a 1:1 re-imaging function to ensure that the beam size of the K selected sub-beams is substantially equal at the first MEMS mirror array 341 and the second MEMS mirror array 342. Thus, it is preferred that the focal lengths of the third spherical lens 523, the fourth spherical lens 525, the fifth spherical lens 626, and the sixth spherical lens 627 be substantially equal, that adjacent spherical lenses be spaced approximately two focal lengths apart, that the first MEMS mirror array 341 be disposed approximately in a focal plane of the third spherical lens 523, and that the second MEMS mirror array 342 be disposed approximately in a focal plane of the sixth spherical lens 627.

Advantageously, the third spherical lens 523, the fourth spherical lens 525, the fifth spherical lens 626, and the sixth spherical lens 627 ensure that the beam size of the K selected sub-beams remains relatively small and uniform as the K selected sub-beams propagate from the first MEMS mirror array 341 to the second MEMS mirror array 342, allowing a more compact M×N WSS 600.

Furthermore, the inclusion of the two additional spherical lenses, advantageously, ensures that the K selected sub-beams are not horizontally inverted. Therefore, the first transmissive diffraction grating 331 and the second transmissive diffraction grating 332 have a common horizontal dispersion direction, and the first MEMS mirror array 341 and the second MEMS mirror array 342 have the same orientation relative to the dispersion direction.

The second MEMS mirror array 342 receives the K selected sub-beams from the sixth spherical lens 627, and the output optical path from the second MEMS mirror array 342 to the N output ports 312 in the fourth embodiment of the M×N WSS 600 is similar to that in the first embodiment of the M×N WSS 300.

It will be apparent to those skilled in the art that the M×N WSS 600 may be "folded" across the central plane 401 according to a variety of designs to obtain a more compact embodiment that does not include the fifth spherical lens 626, the sixth spherical lens 627, the second spherical lens 322, or the second transmissive diffraction grating 332. The functions of these elements may be realized by a second pass through the fourth spherical lens 525, the third spherical lens 523, the first spherical lens 321, and the first transmissive diffraction grating 331. In such a "folded" design, a retroreflector may be inserted at the central plane 401, for example.

Figure 7A:
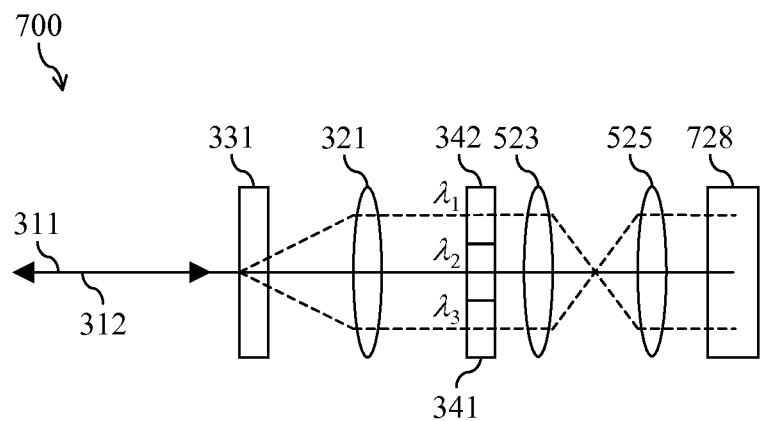
FIG. 7A is a schematic illustration of a top view of a fifth embodiment of an M×N WSS according to the present invention.
Figure 7B:
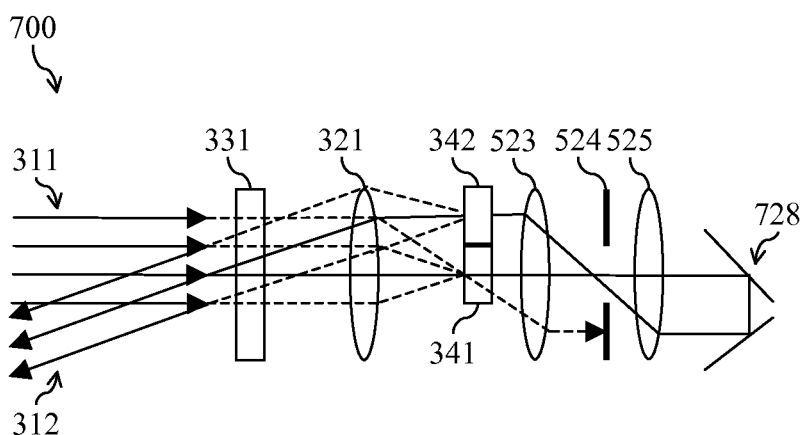
FIG. 7B is a schematic illustration of a side view of the fifth embodiment of FIG. 7A.

With reference to FIGS. 7A and 7B, a fifth embodiment of the M×N WSS 700 demonstrates one possible "folded" design. The fifth embodiment of the M×N WSS 700 is similar to the fourth embodiment of the M×N WSS 600, but does not include the fifth spherical lens 626, the sixth spherical lens 627, the second spherical lens 322, or the second transmissive diffraction grating 332. The M×N WSS 700 also includes a retroreflector 728, inserted after the fourth spherical lens 525 at a back end of the M×N WSS 700, as part of the redirecting system.

Accordingly, the M input ports 311 and the N output ports 312 are disposed at a front end of the M×N WSS 700. Typically, the M input ports 311 and the N output ports 312 are arranged in vertical one-dimensional arrays.

The input optical path from the M input ports 311 to the fourth spherical lens 525 in the fifth embodiment of the M×N WSS 700 is similar to that in the fourth embodiment of the M×N WSS 600. The fourth spherical lens 525 then redirects the K selected sub-beams towards the retroreflector 728.

The retroreflector 728, which is a pair of perpendicular planar mirrors, receives the K selected sub-beams from the fourth spherical lens 525 and redirects the K selected sub-beams back towards the fourth spherical lens 525. The retroreflector 728 reflects the K selected sub-beams back along an output optical path that is parallel to the input optical path, but vertically offset (FIG. 7B).

The fourth spherical lens 525 receives the K selected sub-beams from the retroreflector 728 and redirects the K selected sub-beams back towards the aperture 524. The fourth spherical lens 525 horizontally converges the K selected sub-beams (FIG. 7A). That is, the fourth spherical lens 525 provides a horizontal offset-to-angle function (FIG. 7A), re-converting the offsets imparted by the first pass through the fourth spherical lens 525 into angles. The fourth spherical lens 525 also vertically redirects the K selected sub-beams (FIG. 7B), ensuring that the K selected sub-beams pass back through the aperture 524.

The aperture 524 receives the K selected sub-beams from the fourth spherical lens 525 and passes the K selected sub-beams back towards the third spherical lens 523.

The third spherical lens 523 receives the K selected sub-beams from the aperture 524 and redirects the K selected sub-beams towards the second MEMS mirror array 342. The third spherical lens 523 makes the K selected sub-beams horizontally parallel (FIG. 7A). That is, the third spherical lens 523 provides a horizontal angle-to-offset function (FIG. 7A), re-converting the angles imparted by the second pass through the fourth spherical lens 525 into offsets. The third spherical lens 523 also vertically redirects the K selected sub-beams (FIG. 7B). Thereby, the K selected sub-beams are re-imaged onto the second MEMS mirror array 342.

Preferably, the third spherical lens 523 and the fourth spherical lens 525, which are each passed twice, provide a 1:1 re-imaging function to ensure that the beam size of the K selected sub-beams is substantially equal at the first MEMS mirror array 341 and the second MEMS mirror array 342. Thus, it is preferred that the focal lengths of the third spherical lens 523 and the fourth spherical lens 525 be substantially equal, that the third spherical lens 523 and the fourth spherical lens 525 be spaced approximately two focal lengths apart, that the retroreflector 728 be disposed approximately in a focal plane of the fourth spherical lens 525, and that the first MEMS mirror array 341 and the second MEMS mirror array 342 be disposed approximately in a focal plane of the third spherical lens 523.

Advantageously, the third spherical lens 523 and the fourth spherical lens 525, which are each passed twice, ensure that the beam size of the K selected sub-beams remains relatively small and uniform as the K selected sub-beams propagate from the first MEMS mirror array 341 to the second MEMS mirror array 342, allowing a more compact M×N WSS 700.

The second MEMS mirror array 342, which is disposed vertically adjacent to the first MEMS mirror array 341, receives the K selected sub-beams from the third spherical lens 523, and the output optical path from the second MEMS mirror array 342 to the N output ports 312 in the fifth embodiment of the M×N WSS 700 is similar to that in the first embodiment of the M×N WSS 300, the functions of the second spherical lens 322 and the second transmissive diffraction grating 332 being realized by a second pass through the first spherical lens 321 and the first transmissive diffraction grating 331, respectively.

Figure 8A:
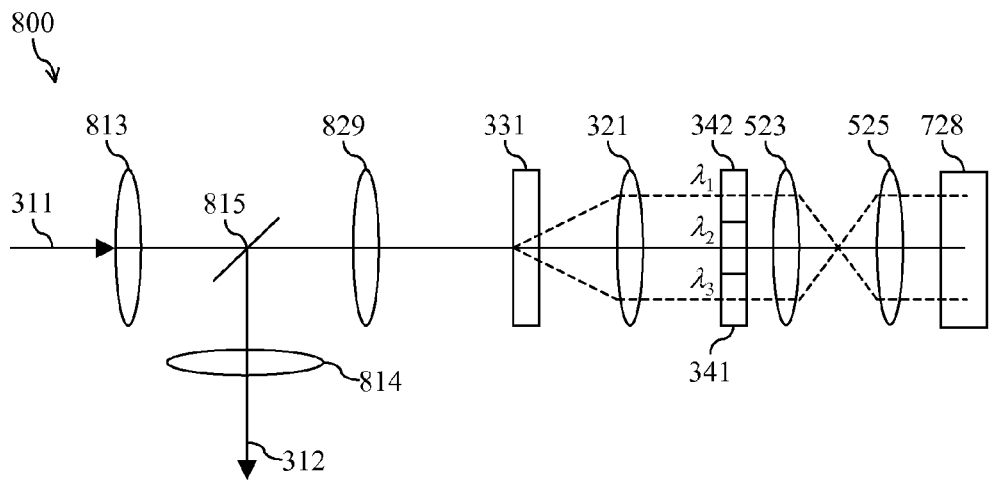
FIG. 8A is a schematic illustration of a top view of a sixth embodiment of an M×N WSS according to the present invention.
Figure 8B:
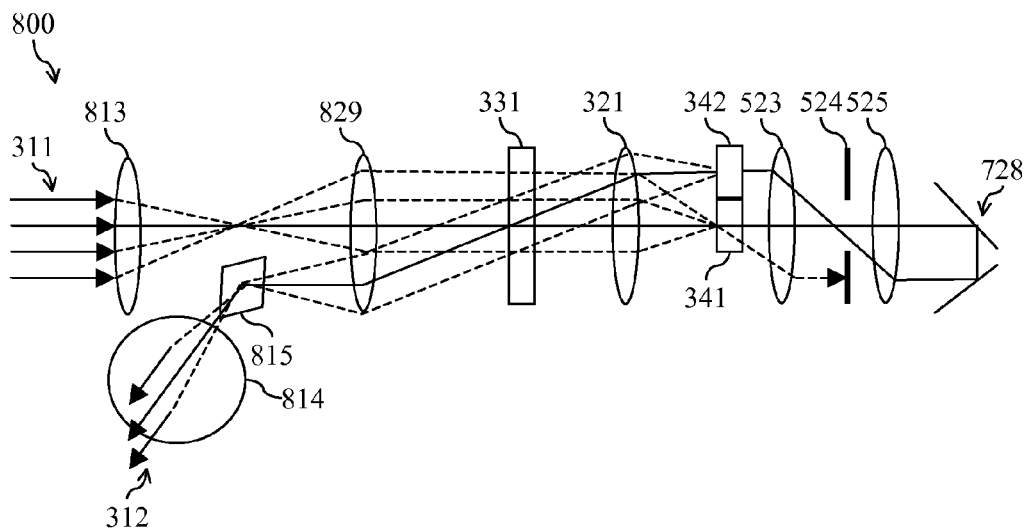
FIG. 8B is a schematic illustration of a side view of the sixth embodiment of FIG. 8A.

With reference to FIGS. 8A and 8B, a sixth embodiment of the M×N WSS 800 demonstrates another possible "folded" design having separated input ports 311 and output ports 312. The sixth embodiment of the M×N WSS 800 is similar to the fifth embodiment of the M×N WSS 700, but means have been added to more easily separate the M input ports 311 and the N output ports 312. The M×N WSS 800 includes a seventh spherical lens 829, inserted before the first transmissive diffraction grating 331, as part of the redirecting system. The M×N WSS 800 also includes an input lens 813, inserted at a front end of the M×N WSS 800 between the M input ports 311 and the seventh spherical lens 829, as well as an output lens 814 and a first fold mirror 815, inserted at the front end between the N output ports 312 and the seventh spherical lens 829. The seventh spherical lens 829, the input lens 813, and the output lens 814 all have positive optical power.

The input lens 813, which is a spherical lens or a vertical cylindrical lens, receives the M input beams from the M input ports 311 and redirects the M input beams towards the seventh spherical lens 829. The input lens 813 vertically converges the M input beams (FIG. 8B). That is, the input lens 813 provides a vertical offset-to-angle function (FIG. 8B), converting offsets between the M input ports 311 in the one-dimensional array into angles. Preferably, the M input ports 311 are disposed approximately in a focal plane of the input lens 813.

The seventh spherical lens 829 receives the M input beams from the input lens 813 and redirects the M input beams towards the first transmissive diffraction grating 331. The seventh spherical lens 829 makes the M input beams vertically parallel (FIG. 8B). That is, the seventh spherical lens 829 provides a vertical angle-to-offset function (FIG. 8B), re-converting angles imparted by the input lens 813 into offsets. Thereby, the M input beams are re-imaged onto the first transmissive diffraction grating 331.

Preferably, the input lens 813 and the seventh spherical lens 829 provide a beam-expanding function to magnify the M input beams to a convenient size for incidence on the first transmissive diffraction grating 331. Thus, it is preferred that the input lens 813 and the seventh spherical lens 829 are spaced by a sum of their focal lengths, and the first transmissive diffraction grating 331 be disposed approximately in a focal plane of the seventh spherical lens 829.

The first transmissive diffraction grating 331 receives the M input beams from the seventh spherical lens 829. The input optical path from the first transmissive diffraction grating 331 to the retroreflector 728 and the output optical path from the retroreflector 728 back to the first transmissive diffraction grating 331 are similar to those in the fifth embodiment of the M×N WSS 700.

The seventh spherical lens 829 then receives the K selected sub-beams, in the form of the at most N output beams, from the first transmissive diffraction grating 331 and redirects the K selected sub-beams towards the first fold mirror 815. The seventh spherical lens 829 vertically converges the K selected sub-beams (FIG. 7B). That is, the seventh spherical lens 829 provides a vertical offset-to-angle function (FIG. 7B), converting offsets imparted by the first spherical lens 321 into angles.

The first fold mirror 815, which is a planar mirror, receives the K selected sub-beams, in the form of the at most N output beams, from the seventh spherical lens 829 and redirects the K selected sub-beams towards the output lens 814.

The output lens 814, which is a spherical lens or a vertical cylindrical lens, receives the K selected sub-beams, in the form of the at most N output beams, from the first fold mirror 815 and redirects the K selected sub-beams towards the N output ports 312. The output lens 814 makes the at most N output beams vertically parallel (FIG. 8B). That is, the output spherical lens 814 provides a vertical angle-to-offset function (FIG. 8B), converting angles imparted by the seventh spherical lens 829 into offsets. Thereby, the K selected sub-beams, in the form of the at most N output beams, are re-imaged onto the N output ports 312.

Preferably, the seventh spherical lens 829 and the output lens 814 provide a beam-reducing function to demagnify the at most N output beams to a convenient size for coupling to optical fibers via the N output ports 312. Thus, it is preferred that the first fold mirror 815 be disposed approximately in a focal plane of the seventh spherical lens 829 and approximately in a focal plane of the output lens 814.

The N output ports 312 receive the K selected sub-beams, in the form of the at most N output beams, from the output lens 814.

It will be apparent to those skilled in the art that, in any of the first to sixth embodiments of the M×N WSS 300-800, transmissive components may be replaced by reflective components and vice versa. For example, transmissive diffraction gratings may be replaced by reflective diffraction gratings, spherical lenses may be replaced by spherical mirrors, cylindrical lenses may be replaced by cylindrical mirrors, and perpendicular planar mirrors may be replaced by right-angle prisms.

Figure 9:
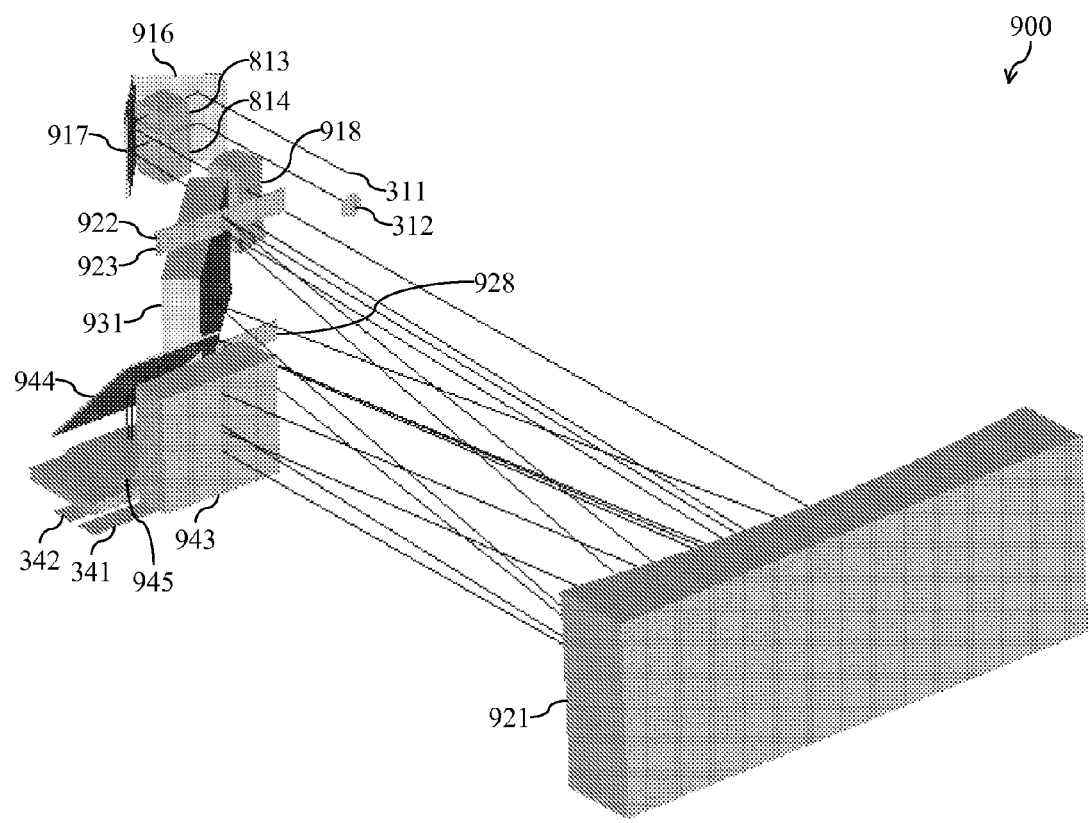
FIG. 9 is a schematic illustration of a perspective view of a seventh embodiment of an M×N WSS according to the present invention.

With reference to FIG. 9, a seventh embodiment of the M×N WSS 900 demonstrates another possible "folded" design, in which transmissive components of the sixth embodiment of the M×N WSS 800 are replaced by reflective components. The M×N WSS 900 includes a reflective diffraction grating 931, as part of the wavelength-dispersing system, instead of the first transmissive diffraction grating 331. As part of the redirecting system, the M×N WSS 900 includes a spherical mirror 921 having positive optical power, instead of the seventh spherical lens 829, the first spherical lens 321, the third spherical lens 523, and the fourth spherical lens 525, as well as a first planar mirror 922 and a second planar mirror 923, instead of the aperture 524. Furthermore, the M input ports 311 and the N output ports 312 are arranged in a single vertical one-dimensional array, rather than separate arrays, and the M×N WSS 900 does not include the first fold mirror 815.

For ease of understanding, the optical path through the M×N WSS 900 may be summarized as follows: M input ports 311, input lens 813, first pass by spherical mirror 921, first pass by reflective diffraction grating 931, second pass by spherical mirror 921, first MEMS mirror array 341, third pass by spherical mirror 921, first planar mirror 922, fourth pass by spherical mirror 921, retroreflector 928, fifth pass by spherical mirror 921, second planar mirror 923, sixth pass by spherical mirror 921, second MEMS mirror array 342, seventh pass by spherical mirror 921, second pass by reflective diffraction grating 931, eighth pass by spherical mirror 921, output lens 814, N output ports 312.

Optionally, the M×N WSS 900 may include a second fold mirror 916 and a third fold mirror 917, which are planar mirrors, the input lens 813 and the output lens 814 being disposed therebetween, to provide a more compact front-end arrangement, as described in U.S. Patent Application Publication No. 2011/0170867. Also optionally, the M×N WSS 900 may include a conditioning lens 918 having positive optical power, which is a spherical lens or a horizontal cylindrical lens, to provide elliptical beam cross-sections, as described in U.S. Patent Application Publication No. 2011/0170867.

The input optical path from the M input ports 311 to the first MEMS mirror array 341 in the seventh embodiment of the M×N WSS 900 is similar to that in the sixth embodiment of the M×N WSS 800, the functions of the seventh spherical lens 829 and the first spherical lens 321 being realized by the first pass and the second pass by the spherical mirror 921, respectively, and the function of the first transmissive diffraction grating 331 being realized by the first pass by the reflective diffraction grating 931.

Optionally, the M×N WSS 900 may include a field-flattening wedge 943, disposed between the spherical mirror 921 and both the first MEMS mirror array 341 and the second MEMS mirror array 342 at a back end of the M×N WSS 900, to provide optical-path corrections, as described in U.S. Pat. No. 6,760,501. Also optionally, the M×N WSS 900 may include a fourth fold mirror 944, disposed between the spherical mirror 921 and both the first MEMS mirror array 341 and the second MEMS mirror array 342, so that the plane of the first MEMS mirror array 341 and the second MEMS mirror array 342 may be located beneath the rest of the optical elements, allowing easier electrical connections to the two mirror arrays. Also optionally, the M×N WSS 900 may include a cover glass 945, disposed between the spherical mirror 921 and both the first MEMS mirror array 341 and the second MEMS mirror array 342.

The spherical mirror 921, in the third pass, receives the M×K sub-beams from the first MEMS mirror array 341 and redirects the K selected sub-beams towards the first planar mirror 922. The spherical mirror 921 horizontally converges the M×K sub-beams and makes the M×K sub-beams vertically parallel. That is, the spherical mirror 921 provides a horizontal offset-to-angle function, converting offsets between the K mirrors in the first MEMS mirror array 341 into angles. Simultaneously, the spherical mirror 921 provides a vertical angle-to-offset function, converting angles imparted by the first MEMS mirror array 341 into offsets. Advantageously, the offsets imparted by the spherical mirror 921 ensure that only the K selected sub-beams are vertically aligned with the first planar mirror 922, while the (M−1)×K non-selected sub-beams are vertically offset from the first planar mirror 922. Thereby, the K selected sub-beams are passed to the second MEMS mirror array 342, while the (M−1)×K non-selected sub-beams are blocked from reaching the second MEMS mirror array 342.

The first planar mirror 922 receives the K selected sub-beams from the spherical mirror 921 and redirects the K selected sub-beams back towards the spherical mirror 921.

The spherical mirror 921, in the fourth pass, receives the K selected sub-beams from the first planar mirror 922 and redirects the K selected sub-beams towards the retroreflector 928. The spherical mirror 921 makes the K selected sub-beams horizontally parallel. That is, the fourth spherical lens 525 provides a horizontal angle-to-offset function, re-converting the angles imparted by the third pass by the spherical mirror 921 into offsets The retroreflector 928, which is a planar mirror, receives the K selected sub-beams from the spherical mirror 921 and redirects the K selected sub-beams back towards the spherical mirror 921.

The spherical mirror 921, in the fifth pass, receives the K selected sub-beams from the retroreflector 928 and redirects the K selected sub-beams towards the second planar mirror 923. The spherical mirror 921 horizontally converges the K selected sub-beams. That is, the spherical mirror 921 provides a horizontal offset-to-angle function, re-converting the offsets imparted by the fourth pass by the spherical mirror 921 into angles.

The second planar mirror 923 receives the K selected sub-beams from the spherical mirror 921 and redirects the K selected sub-beams towards back towards the spherical mirror 921. Preferably, the second planar mirror 923 is disposed non-parallel to the first planar mirror 922.

The spherical mirror 921, in the sixth pass, receives the K selected sub-beams from the second planar mirror 923 and redirects the K selected sub-beams towards the second MEMS mirror array 342. The spherical mirror 921 makes the K selected sub-beams horizontally parallel. That is, the spherical mirror 921 provides a horizontal angle-to-offset function, re-converting the angles imparted by the fifth pass by the spherical mirror 921 into offsets. Thereby, the K selected sub-beams are re-imaged onto the second MEMS mirror array 342.

Preferably, the third, fourth, fifth, and sixth passes by the spherical mirror 921 provide a 1:1 re-imaging function to ensure that the beam size of the K selected sub-beams is substantially equal at the first MEMS mirror array 341 and the second MEMS mirror array 342. Thus, it is preferred that the first planar mirror 922 and the second planar mirror 923 be disposed approximately in a focal plane of the spherical mirror 921.

Advantageously, the four passes by the spherical mirror 921 ensure that the beam size of the K selected sub-beams remains relatively small and uniform at the first MEMS mirror array 341 and at the second MEMS mirror array 342, allowing a more compact M×N WSS 900.

The second MEMS mirror array 342 receives the K selected sub-beams from the spherical mirror 921, and the output optical path from the second MEMS mirror array 342 to the N output ports 312 in the seventh embodiment of the M×N WSS 900 is similar to that in the sixth embodiment of the M×N WSS 800, the functions of the first spherical lens 321 and the seventh spherical lens 829 being realized by the seventh pass and the eighth pass by the spherical mirror 921, respectively, and the function of the first transmissive diffraction grating 331 being realized by the second pass by the reflective diffraction grating 931. However, as the output optical path does not include the first fold mirror 815, the output lens 814 receives the K selected sub-beams from the spherical mirror 921.

Of course, numerous other embodiments may be envisaged without departing from the spirit and scope of the invention.

I claim:

1. An M×N wavelength-selective switch (WSS) comprising:

M input ports for launching M input beams, wherein each of the M input beams includes K sub-beams at K wavelength bands, and wherein M and K are integers greater than 1;

N output ports for outputting K selected sub-beams at the K wavelength bands, wherein N is an integer greater than 1;

a wavelength-dispersing system, disposed to receive the M input beams from the M input ports, for dispersing the M input beams into the M×K sub-beams;

a redirecting system including at least one relaying element having optical power, wherein the redirecting system is disposed to receive the M×K sub-beams from the wavelength-dispersing system, and is for redirecting the M×K sub-beams;

a first switching array of K first reflecting elements, disposed to receive the M×K sub-beams from the redirecting system, for selecting the K selected sub-beams from the M×K sub-beams;

wherein each of the K first reflecting elements is associated with one wavelength band of the K wavelength bands, is disposed to receive the M sub-beams at that wavelength band, and is for selecting one sub-beam from the M sub-beams at that wavelength band;

wherein the redirecting system is also disposed to receive the M×K sub-beams from the first switching array, and is also for passing the K selected sub-beams while blocking the (M−1)×K non-selected sub-beams, and for re-imaging only the K selected sub-beams by means of the at least one relaying element;

a second switching array of K second reflecting elements, disposed to receive the K selected sub-beams from the redirecting system, for routing the K selected sub-beams to the N output ports;

wherein each of the K second reflecting elements is associated with one wavelength band of the K wavelength bands, is disposed to receive the selected sub-beam at that wavelength band, and is for routing the selected sub-beam at that wavelength band to one output port of the N output ports;

wherein the redirecting system is also disposed to receive the K selected sub-beams from the second switching array, and is also for redirecting the K selected sub-beams;

wherein the wavelength-dispersing system is also disposed to receive the K selected sub-beams from the redirecting system, and is also for combining any selected sub-beams that are routed to a same output port of the N output ports; and wherein the N output ports are disposed to receive the K selected sub-beams from the wavelength-dispersing system.

2. The M×N WSS of claim 1, wherein the K selected sub-beams are not combined by means of a wavelength-dispersing element between the first switching array and the second switching array.

3. The M×N WSS of claim 1, wherein the wavelength-dispersing system includes at least one wavelength-dispersing element, and wherein the at least one wavelength-dispersing element is a transmissive diffraction grating, a reflective diffraction grating, or a combination of a transmissive diffraction grating and a planar mirror.

4. The M×N WSS of claim 1, wherein the at least one relaying element is a spherical lens, a spherical mirror, a cylindrical lens, or a cylindrical mirror.

5. The M×N WSS of claim 1, wherein the first switching array and the second switching array are microelectromechanical system (MEMS) mirror arrays or liquid crystal on silicon (LCOS) arrays.

6. The M×N WSS of claim 1, wherein the wavelength-dispersing system includes:
a first wavelength-dispersing element, disposed to receive the M input beams from the M input ports, for dispersing the M input beams into the M×K sub-beams; and
a second wavelength-dispersing element for combining any selected sub-beams that are routed to a same output port of the N output ports; and
wherein the redirecting system includes:
a first redirecting element having optical power, disposed to receive the M×K sub-beams from the first wavelength-dispersing element, for redirecting the M×K sub-beams;
a relaying assembly including the at least one relaying element, wherein the relaying assembly is disposed to receive the M×K sub-beams from the first switching array, is for passing the K selected sub-beams while blocking the (M−1)×K non-selected sub-beams, and is for re-imaging only the K selected sub-beams onto the second switching array by means of the at least one relaying element; and
a second redirecting element having optical power, disposed to receive the K selected sub-beams from the second switching array, for redirecting the K selected sub-beams;
wherein the first switching array is disposed to receive the M×K sub-beams from the first redirecting element;
wherein the second switching array is disposed to receive the K selected sub-beams from the relaying assembly; and
wherein the second wavelength-dispersing element is disposed to receive the K selected sub-beams from the second redirecting element.

7. The M×N WSS of claim 6, wherein the relaying assembly includes:
a first relaying element having optical power, disposed to receive the M×K sub-beams from the first switching array, for redirecting the M×K sub-beams;
a blocking element, disposed to receive the M×K sub-beams from the first relaying element, for passing the K selected sub-beams while blocking the (M−1)×K non-selected sub-beams; and
a second relaying element having optical power, disposed to receive the K selected sub-beams from the blocking element, for redirecting the K selected sub-beams;
wherein the first relaying element and the second relaying element, in combination, are for re-imaging only the K selected sub-beams onto the second switching array; and
wherein the second switching array is disposed to receive the K selected sub-beams from the second relaying element.

8. The M×N WSS of claim 7, wherein the first wavelength-dispersing element has a dispersion direction;
wherein the first wavelength-dispersing element and the second wavelength-dispersing element are transmissive diffraction gratings or reflective diffraction gratings;
wherein the first redirecting element and the second redirecting element are spherical lenses or spherical mirrors having positive optical power;
wherein the first relaying element and the second relaying element are cylindrical lenses or cylindrical mirrors having positive optical power in the dispersion direction; and
wherein the blocking element is a cylindrical lens or a cylindrical mirror having positive optical power in a direction perpendicular to the dispersion direction.

9. The M×N WSS of claim 7, wherein the first wavelength-dispersing element and the second wavelength-dispersing element are transmissive diffraction gratings or reflective diffraction gratings;
wherein the first redirecting element, the second redirecting element, the first relaying element, and the second relaying element are spherical lenses or spherical mirrors having positive optical power; and
wherein the blocking element is an aperture.

10. The M×N WSS of claim 6, wherein the relaying assembly includes:
a first relaying element having optical power, disposed to receive the M×K sub-beams from the first switching array, for redirecting the M×K sub-beams;
a blocking element, disposed to receive the M×K sub-beams from the first relaying element, for passing the K selected sub-beams while blocking the (M−1)×K non-selected sub-beams;
a second relaying element having optical power, disposed to receive the K selected sub-beams from the blocking element, for redirecting the K selected sub-beams;
a third relaying element having optical power, disposed to receive the K selected sub-beams from the second relaying element, for redirecting the K selected sub-beams; and
a fourth relaying element having optical power, disposed to receive the K selected sub-beams from the third relaying element, for redirecting the K selected sub-beams;
wherein the first relaying element, the second relaying element, the third relaying element, and the fourth relaying element, in combination, are for re-imaging only the K selected sub-beams onto the second switching array; and
wherein the second switching array is disposed to receive the K selected sub-beams from the fourth relaying element.

11. The M×N WSS of claim 10, wherein the first wavelength-dispersing element and the second wavelength-dispersing element are transmissive diffraction gratings or reflective diffraction gratings;
wherein the first redirecting element, the second redirecting element, the first relaying element, the second relaying element, the third relaying element, and the fourth relaying element are spherical lenses or spherical mirrors having positive optical power; and
wherein the blocking element is an aperture.

12. The M×N WSS of claim 6, wherein the relaying assembly includes:

a first relaying element having optical power, disposed to receive the M×K sub-beams from the first switching array, for redirecting the M×K sub-beams;

a second relaying element having optical power, disposed to receive the M×K selected sub-beams from the first relaying element, for redirecting the M×K sub-beams;

a blocking element, disposed to receive the M×K sub-beams from the second relaying element, for passing the K selected sub-beams while blocking the (M−1)×K non-selected sub-beams;

a third relaying element having optical power, disposed to receive the K selected sub-beams from the blocking element, for redirecting the K selected sub-beams; and a fourth relaying element having optical power, disposed to receive the K selected sub-beams from the third relaying element, for redirecting the K selected sub-beams;

wherein the first relaying element, the second relaying element, the third relaying element, and the fourth relaying element, in combination, are for re-imaging only the K selected sub-beams onto the second switching array; and wherein the second switching array is disposed to receive the K selected sub-beams from the fourth relaying element.

13. The M×N WSS of claim 12, wherein the first wavelength-dispersing element has a dispersion direction;

wherein the first wavelength-dispersing element and the second wavelength-dispersing element are transmissive diffraction gratings or reflective diffraction gratings;

wherein the first redirecting element and the second redirecting element are spherical lenses or spherical mirrors having positive optical power;

wherein the first relaying element, the second relaying element, the third relaying element, and the fourth relaying element are cylindrical lenses or cylindrical mirrors having positive optical power in the dispersion direction; and wherein the blocking element is a cylindrical lens or a cylindrical mirror having positive optical power in a direction perpendicular to the dispersion direction.

14. The M×N WSS of claim 1, wherein the wavelength-dispersing system includes:

a first wavelength-dispersing element, disposed to receive the M input beams from the M input ports, for dispersing the M input beams into the M×K sub-beams, and for combining any selected sub-beams that are routed to a same output port of the N output ports; and wherein the redirecting system includes:

a first redirecting element having optical power, disposed to receive the M×K sub-beams from the first wavelength-dispersing element and to receive the K selected sub-beams from the second switching array, for redirecting the M×K sub-beams, and for redirecting the K selected sub-beams; and a relaying assembly including the at least one relaying element, wherein the relaying assembly is disposed to receive the M×K sub-beams from the first switching array, is for passing the K selected sub-beams while blocking the (M−1)×K non-selected sub-beams, and is for re-imaging only the K selected sub-beams onto the second switching array by means of at the least relaying element;

wherein the first switching array is disposed to receive the M×K sub-beams from the first redirecting element;

wherein the second switching array is disposed to receive the K selected sub-beams from the relaying assembly; and wherein the first wavelength-dispersing element is also disposed to receive the K selected sub-beams from the first redirecting element.

15. The M×N WSS of claim 14, wherein the relaying assembly includes:

a first relaying element having optical power, disposed to receive the M×K sub-beams from the first switching array, for redirecting the M×K sub-beams, and for redirecting the K selected sub-beams;

a blocking element, disposed to receive the M×K sub-beams from the first relaying element, for passing the K selected sub-beams while blocking the (M−1)×K non-selected sub-beams;

a second relaying element having optical power, disposed to receive the K selected sub-beams from the blocking element, for redirecting the K selected sub-beams; and a retroreflector, disposed to receive the K selected sub-beams from the second relaying element, for redirecting the K selected sub-beams;

wherein the second relaying element is also disposed to receive the K selected sub-beams from the retroreflector;

wherein the blocking element is also disposed to receive the K selected sub-beams from the second relaying element;

wherein the first relaying element is also disposed to receive the K selected sub-beams from the blocking element; and wherein the first relaying element and the second relaying element, in combination, are for re-imaging only the K selected sub-beams onto the second switching array; and wherein the second switching array is disposed to receive the K selected sub-beams from the first relaying element.

16. The M×N WSS of claim 15, wherein the first wavelength-dispersing element is a transmissive diffraction grating or a reflective diffraction grating;

wherein the first redirecting element, the first relaying element, and the second relaying element are spherical lenses or spherical mirrors having positive optical power;

wherein the blocking element is an aperture; and wherein the retroreflector is a pair of perpendicular planar mirrors or a right-angle prism.

17. The M×N WSS of claim 1, wherein the wavelength-dispersing system includes:

a first wavelength-dispersing element, disposed to receive the M input beams from the M input ports, for dispersing the M input beams into the M×K sub-beams, and for combining any selected sub-beams that are routed to a same output port of the N output ports;

wherein the redirecting system includes:

a first relaying element having optical power, disposed to receive the M×K sub-beams from the first wavelength-dispersing element, for redirecting the M×K sub-beams, for passing the K selected sub-beams while blocking the (M−1)×K non-selected sub-beams, for re-imaging only the K selected sub-beams onto the second switching array, and for redirecting the K selected sub-beams;

a second relaying element, disposed to receive the M×K sub-beams from the first switching array via the first relaying element, for redirecting the K selected sub-beams;

a retroreflector, disposed to receive the K selected sub-beams from the second relaying element via the first relaying element, for redirecting the K selected sub-beams; and a third relaying element, disposed to receive the K selected sub-beams from the retroreflector via the first relaying element, for redirecting the K selected sub-beams;

wherein the first switching array is disposed to receive the M×K sub-beams from the first wavelength-dispersing element via the first relaying element;

wherein the second switching array is disposed to receive the K selected sub-beams from the third relaying element via the first relaying element; and wherein the first wavelength-dispersing element is also disposed to receive the K selected sub-beams from the second switching array via the first relaying element.

18. The M×N WSS of claim 17, wherein the first wavelength-dispersing element is a reflective diffraction grating or a combination of a reflective diffraction grating and a planar mirror;

wherein the first relaying element is a spherical mirror having positive optical power; and wherein the second relaying element, the retroreflector, and the third relaying element are planar mirrors.

\* \* \* \* \*